(12) United States Patent
Maeda et al.

(10) Patent No.: US 11,878,741 B2
(45) Date of Patent: Jan. 23, 2024

(54) MULTI-LAYER SLIDING MEMBER AND AUTOMOBILE RACK-AND-PINION STEERING APPARATUS USING SAME

(71) Applicant: OILES CORPORATION, Tokyo (JP)

(72) Inventors: Takuya Maeda, Kanagawa (JP); Tsuyoshi Hashizume, Kanagawa (JP)

(73) Assignee: Oiles Corporation, Tokyo (JP)

( * ) Notice: Subject to any disclaimer, the term of this patent is extended or adjusted under 35 U.S.C. 154(b) by 665 days.

(21) Appl. No.: 17/059,377

(22) PCT Filed: Jul. 9, 2019

(86) PCT No.: PCT/JP2019/027223
§ 371 (c)(1),
(2) Date: Nov. 27, 2020

(87) PCT Pub. No.: WO2020/059261
PCT Pub. Date: Mar. 26, 2020

(65) Prior Publication Data
US 2021/0237792 A1  Aug. 5, 2021

(30) Foreign Application Priority Data
Sep. 19, 2018 (JP) ................. 2018-175466

(51) Int. Cl.
| | |
|---|---|
| *B62D 3/12* | (2006.01) |
| *C08K 3/04* | (2006.01) |
| *C08K 3/30* | (2006.01) |
| *C08L 27/18* | (2006.01) |
| *C08L 67/03* | (2006.01) |
| *C08L 71/10* | (2006.01) |
| *C08L 79/08* | (2006.01) |
| *F16C 33/14* | (2006.01) |
| *F16C 33/20* | (2006.01) |
| *C09D 127/18* | (2006.01) |
| *F16C 33/12* | (2006.01) |
| *F16H 55/26* | (2006.01) |

(52) U.S. Cl.
CPC ............... *B62D 3/126* (2013.01); *C08K 3/04* (2013.01); *C08K 3/30* (2013.01); *C08L 27/18* (2013.01); *C08L 67/03* (2013.01); *C08L 71/10* (2013.01); *C08L 79/08* (2013.01); *C09D 127/18* (2013.01); *F16C 33/128* (2013.01); *F16C 33/145* (2013.01); *F16C 33/201* (2013.01); *F16C 33/203* (2013.01); *C08K 2003/3009* (2013.01); *F16C 2208/32* (2013.01); *F16C 2208/48* (2013.01); *F16H 55/26* (2013.01)

(58) Field of Classification Search
None
See application file for complete search history.

(56) References Cited

U.S. PATENT DOCUMENTS

| | | | | |
|---|---|---|---|---|
| 5,124,397 A | * | 6/1992 | Kanazawa | F04C 27/005 524/495 |
| 5,466,737 A | * | 11/1995 | Oki | C08L 79/08 524/508 |
| 5,900,453 A | * | 5/1999 | Egami | C08L 79/08 524/514 |
| 2012/0275731 A1 | | 11/2012 | Ziegler et al. | |
| 2018/0118251 A1 | * | 5/2018 | Maeda | B62D 3/12 |

FOREIGN PATENT DOCUMENTS

| | | |
|---|---|---|
| CN | 107532649 | 1/2018 |
| EP | 3 195 958 A1 | 7/2017 |
| EP | 3 287 651 | 2/2018 |
| JE | H08-41484 | 2/1996 |
| JP | S39-016950 | 8/1964 |
| JP | S60-95367 | 6/1985 |
| JP | S61-52322 | 11/1986 |
| JP | H01-27495 | 8/1989 |
| JP | 2006-056205 | 3/2006 |
| JP | 2016-205561 | 12/2016 |
| JP | 2017-190870 | 10/2017 |
| WO | 2016/170742 | 10/2016 |
| WO | 2017/175688 | 10/2017 |

OTHER PUBLICATIONS

Extended European Search Report dated May 6, 2022 in European Application No. 19862267.2, 5 pages.
International Search Report for PCT/JP2019/027223 dated Oct. 1, 2019, 5 pages.
Written Opinion of the ISA for PCT/JP2019/027223 dated Oct. 1, 2019, 3 pages.

\* cited by examiner

*Primary Examiner* — Christopher M Rodd
(74) *Attorney, Agent, or Firm* — Nixon & Vanderhye P.C.

(57) ABSTRACT

A multi-layer sliding member (1) includes a backing plate (2) formed from a steel plate, a copper-plated or nickel-plated layer (4) formed on one surface (3) of the backing plate (2), a porous sintered metal layer (5) integrally bonded to the surface (3) of the backing plate (2) through the layer (4), and a coating layer (8) filling pores (6) and coating on the surface (7) of the porous sintered metal layer (5) and formed from a synthetic resin composition. The synthetic resin composition contains a PTFE as a main component and further contains, as additives, 5 to 30% by mass of a thermotropic liquid crystal polymer, 5 to 12% by mass of a polyarylketone resin, 5 to 12% by mass of a melt moldable fluororesin, and 1 to 5% by mass of a polyimide resin.

10 Claims, 6 Drawing Sheets

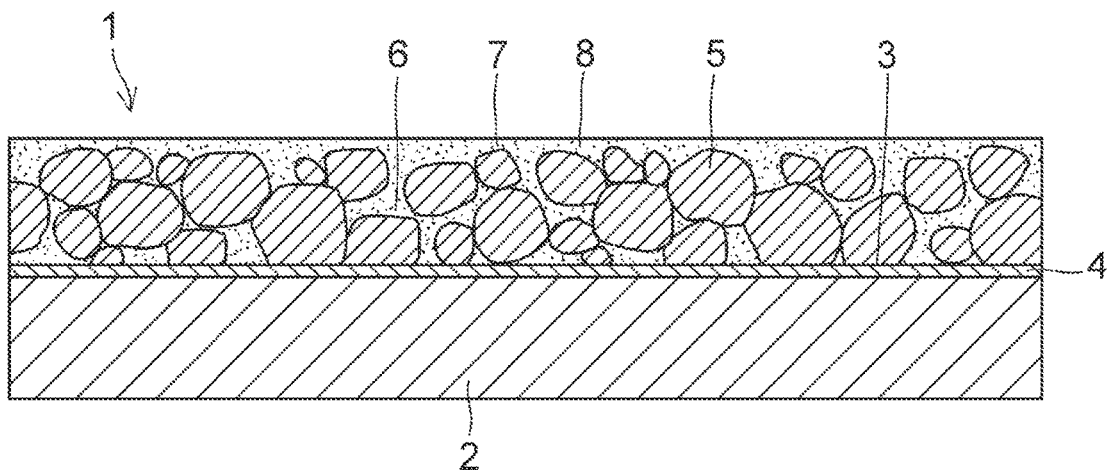
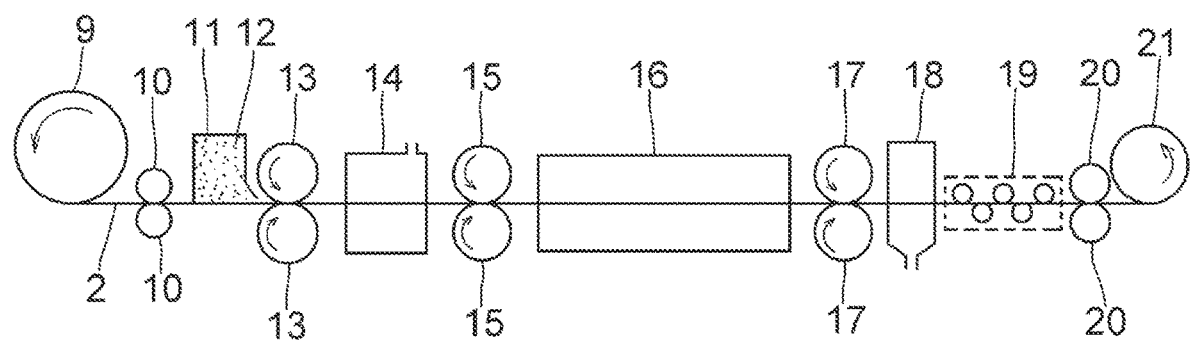

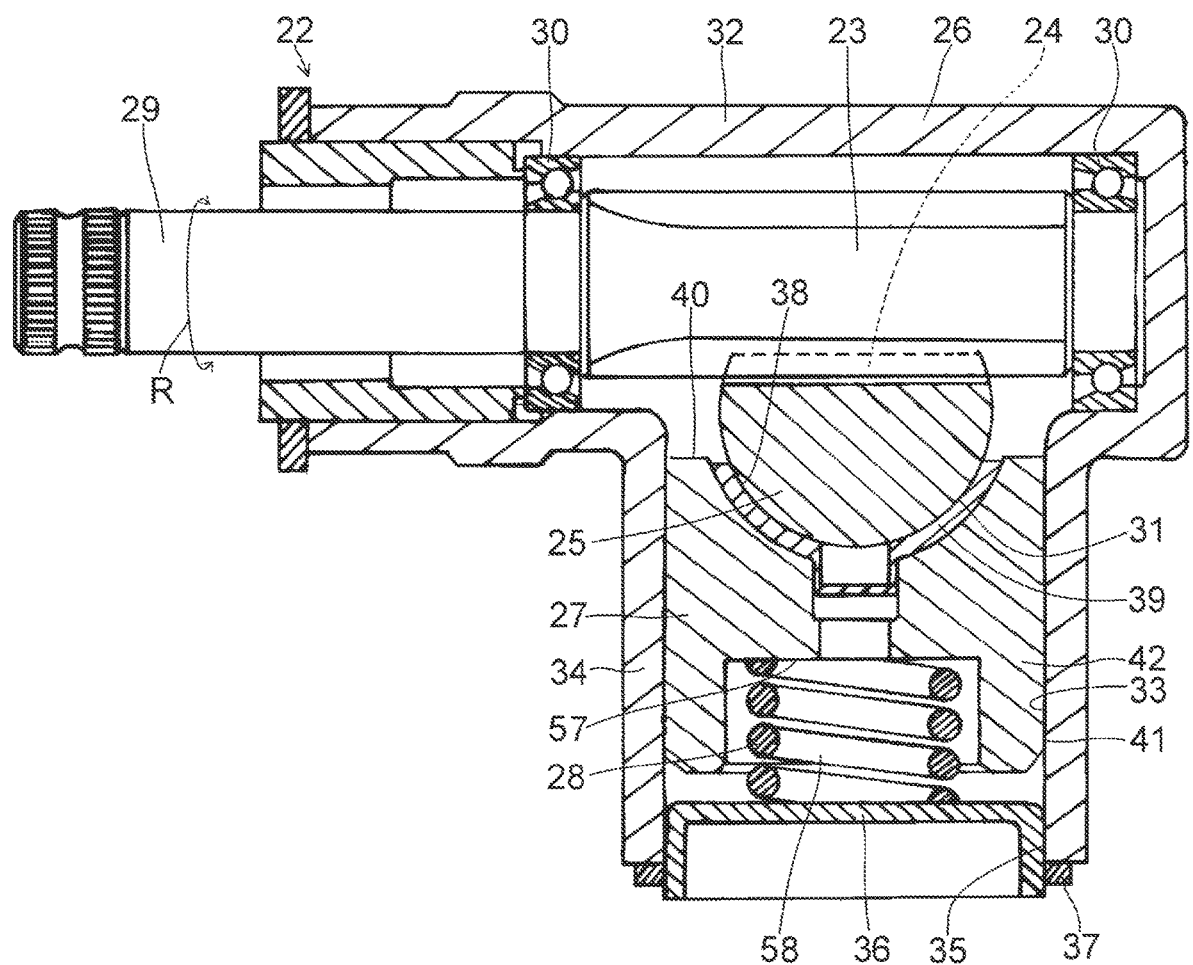

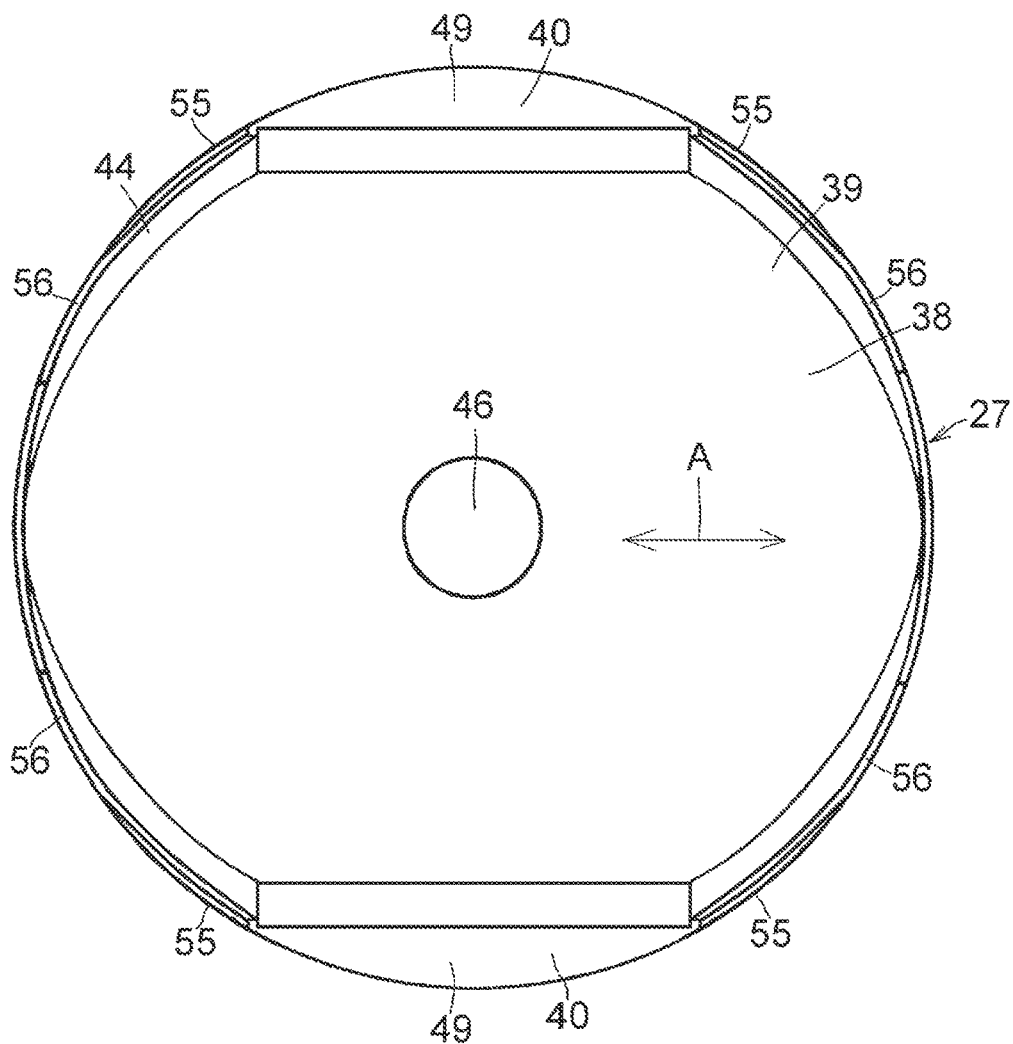
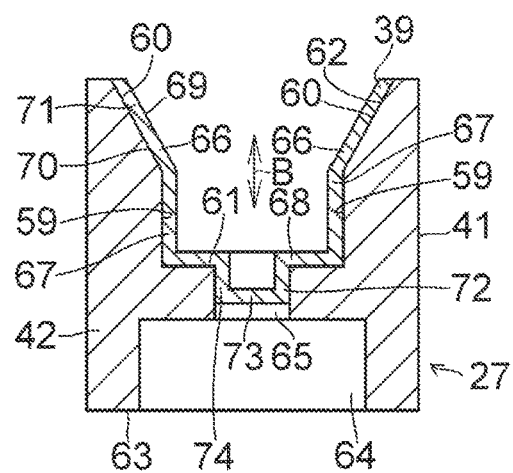

MULTI-LAYER SLIDING MEMBER AND AUTOMOBILE RACK-AND-PINION STEERING APPARATUS USING SAME

CROSS-REFERENCE TO RELATED APPLICATIONS

This application is the U.S. national phase of International Application No. PCT/JP2019/027223 filed Jul. 9, 2019 which designated the U.S. and claims priority to JP 2018-175466 filed Sep. 19, 2018, the entire contents of each of which are hereby incorporated by reference.

TECHNICAL FIELD

The present invention relates to a multi-layer sliding member having excellent friction and wear characteristic and an automobile rack-and-pinion steering apparatus including the member.

BACKGROUND ART

A multi-layer sliding member including a backing plate, a porous sintered metal layer integrally bonded to one surface of the backing plate, and a coating layer filling pores of and coating on the surface of the porous sintered metal layer and formed from a synthetic resin composition (according to Patent Literature 1 to Patent Literature 4) is widely used in the form of what is called a wrapped bush that is produced by cylindrically winding the sliding member while the coating layer is inside or in the form of a sliding plate, as a support unit to smoothly, slidably bear a rotating shaft or a reciprocating member in various mechanical apparatuses.

As the synthetic resin filling the pores of and coating on the surface of the porous sintered metal layer that is integrally bonded to one surface of the backing plate, a tetrafluoroethylene resin or a polyacetal resin is typically used, and such a resin exhibits excellent low friction properties under dry friction conditions or with a lubricant such as grease.

CITATION LIST

Patent Literatures

Patent Literature 1: Japanese Patent Application Publication No. 39-16950
Patent Literature 2: Japanese Patent Application Publication No. 61-52322
Patent Literature 3: Japanese Patent Application Laid-Open No. 8-41484
Patent Literature 4: Japanese Patent Application Laid-Open No. 2006-56205
Patent Literature 5: Japanese Utility Model Application Laid-Open No. 60-95367
Patent Literature 6: Japanese Utility Model Application Publication No. 01-27495

SUMMARY OF INVENTION

Technical Problem

When such a multi-layer sliding member is used for reciprocating sliding purpose, for example, for a rack guide in an automobile rack-and-pinion steering apparatus (according to Patent Literature 5 and Patent Literature 6), and a rack bar supported on the rack guide starts to slide at the start of turning a steering, sliding resistance by static friction works on the rack shaft, and accordingly the rotational torque of a pinion increases, unfortunately. When the rack shaft starts to move, and the state of static friction proceeds to the state of kinetic friction, a reduction in sliding torque, that is, torque loss is caused. An increase in rotational torque of a pinion caused at the start of turning a steering and a reduction in sliding torque by torque loss, that is, a difference between a static friction coefficient and a kinetic friction coefficient caused between a rack shaft and a rack guide supporting the rack bar reflects on the steering operation of a driver and thus affects whether smooth steering feel is achieved.

The present invention has been made in view of the above circumstances and is intended to provide a multi-layer sliding member including a coating layer of a synthetic resin composition having a minimum difference between static friction coefficient and kinetic friction coefficient and a rack-and-pinion steering apparatus capable of achieving smooth steering feel.

Solution to Problem

A multi-layer sliding member of the present invention includes a backing plate, a porous sintered metal layer integrally bonded to one surface of the backing plate, and a coating layer filling pores of the porous sintered metal layer, coating on a surface of the porous sintered metal layer, and formed from a synthetic resin composition. The synthetic resin composition contains a tetrafluoroethylene resin (hereinafter abbreviated as PTFE) as a main component and contains, as additives, 5 to 30% by mass of a thermotropic liquid crystal polymer, 5 to 12% by mass of a polyarylketone resin, 5 to 12% by mass of a melt moldable fluororesin, and 1 to 5% by mass of a polyimide resin.

According to the multi-layer sliding member of the present invention, the coating layer has a structure in which the PTFE as the main component is a matrix, and in the matrix, the thermotropic liquid crystal polymer, the polyarylketone resin, the melt moldable fluororesin, and the polyimide resin are dispersed as additives. The thermotropic liquid crystal polymer helps low friction properties of the matrix, whereas the polyarylketone resin, the melt moldable fluororesin, and the polyimide resin reinforce the matrix to contribute to an improvement in wear resistance of the matrix, and thus stable sliding characteristics are achieved.

A rack-and-pinion steering apparatus of the present invention includes a gearbox, a pinion rotatably supported by the gearbox, a rack bar having a rack tooth that is engaged with the pinion, a rack guide slidably supporting the rack bar, and an elastic element pressing the rack guide toward the rack bar. In the rack-and-pinion steering apparatus, the rack guide includes a rack guide base body provided in the gearbox and includes a sliding piece formed from the multi-layer sliding member and fixed to the rack guide base body at a backing plate side, and the sliding piece has, on the coating layer, a concave sliding that is in slidable contact with an outer peripheral face of the rack bar and slidably supports the rack bar.

In the present invention, the rack guide base body may include an arcuate concave supporting face and have a fitting hole at a bottom center of the arcuate concave face. The sliding piece formed from the multi-layer sliding member may include an arcuate concave sliding face on the coating layer, an arcuate convex fixing face on an opposite face of the sliding face, and at a bottom center of the arcuate concave face, a bottomed cylindrical hollow protrusion extending from the bottom toward the fixing face side and integrally formed on the fixing face.

In a preferred example of the rack guide including the rack guide base body and the sliding piece of the present invention, the sliding piece having the arcuate concave sliding face and formed from the multi-layer sliding member is seated on the arcuate concave supporting face of the rack guide base body while the bottomed cylindrical hollow protrusion integrally formed on the fixing face having a complementary shape to the supporting face is fit to the fitting hole on the supporting face of the rack guide base body, and accordingly the sliding piece is fixed to the rack guide base body.

In the present invention, the rack guide base body may include a concave face having a pair of flat faces facing together, a pair of inclined faces oppositely, integrally extending from the corresponding flat faces, and a bottom flat face integrally extending from the pair of flat faces, and may include a fitting hole at the bottom center of the concave face. The sliding piece formed from the multi-layer sliding member may include a pair of inclined face portions opposite together, a pair of flat face portions continuing from the corresponding inclined face portions, a bottom face portion continuing from the flat face portions, and a bottomed cylindrical hollow protrusion extending from the center of the bottom face portion toward the backing plate side.

In a preferred example of the rack guide including the rack guide base body and the sliding piece of the present invention, the sliding piece formed from the multi-layer sliding member and including the pair of inclined face portions opposite together, the pair of flat face portions continuing from the corresponding inclined face portions, the bottom face portion continuing from the flat face portions, and the bottomed cylindrical hollow protrusion extending from the center of the bottom face portion toward the backing plate side is seated on the concave face of the rack guide base body while the bottomed cylindrical hollow protrusion is fit to the fitting hole at the bottom center of the concave face of the rack guide base body, and accordingly the sliding piece is fixed to the rack guide base body.

Effect of the Invention

According to the present invention, the coating layer of the synthetic resin composition has a minimum difference between static friction coefficient and kinetic friction coefficient, and thus a multi-layer sliding member having excellent friction and wear characteristics and a rack-and-pinion steering apparatus capable of achieving smooth steering feel can be provided.

BRIEF DESCRIPTION OF DRAWINGS

FIG. 1 is a cross-sectional schematic view of a multi-layer sliding member as a preferred example of the present invention.

FIG. 2 is a schematic view showing an example of a production process of the multi-layer sliding member of the present invention.

FIG. 3 is a cross-sectional schematic view showing an example of a preferred rack-and-pinion steering apparatus of the present invention.

FIG. 6 is a schematic plan view of the rack guide shown in FIG. 4.

FIG. 7 is a cross-sectional schematic view of another example of the rack guide included in the rack-and-pinion steering apparatus shown in FIG. 3, taken along line VII-VII in FIG. 8.

DESCRIPTION OF EMBODIMENTS

Figure 4:
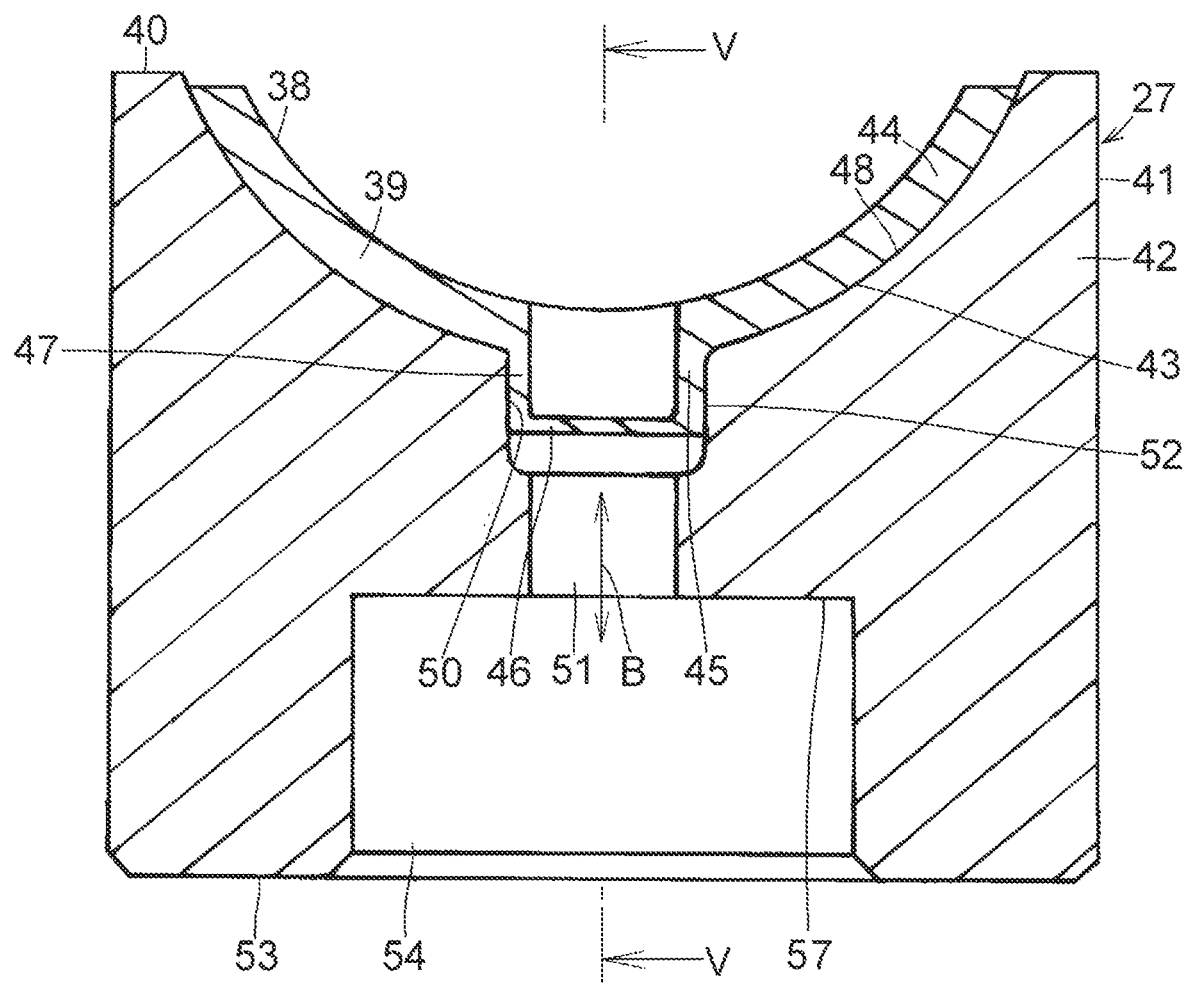
FIG. 4 is a cross-sectional schematic view of a rack guide included in the rack-and-pinion steering apparatus shown in FIG. 3.
Figure 5:
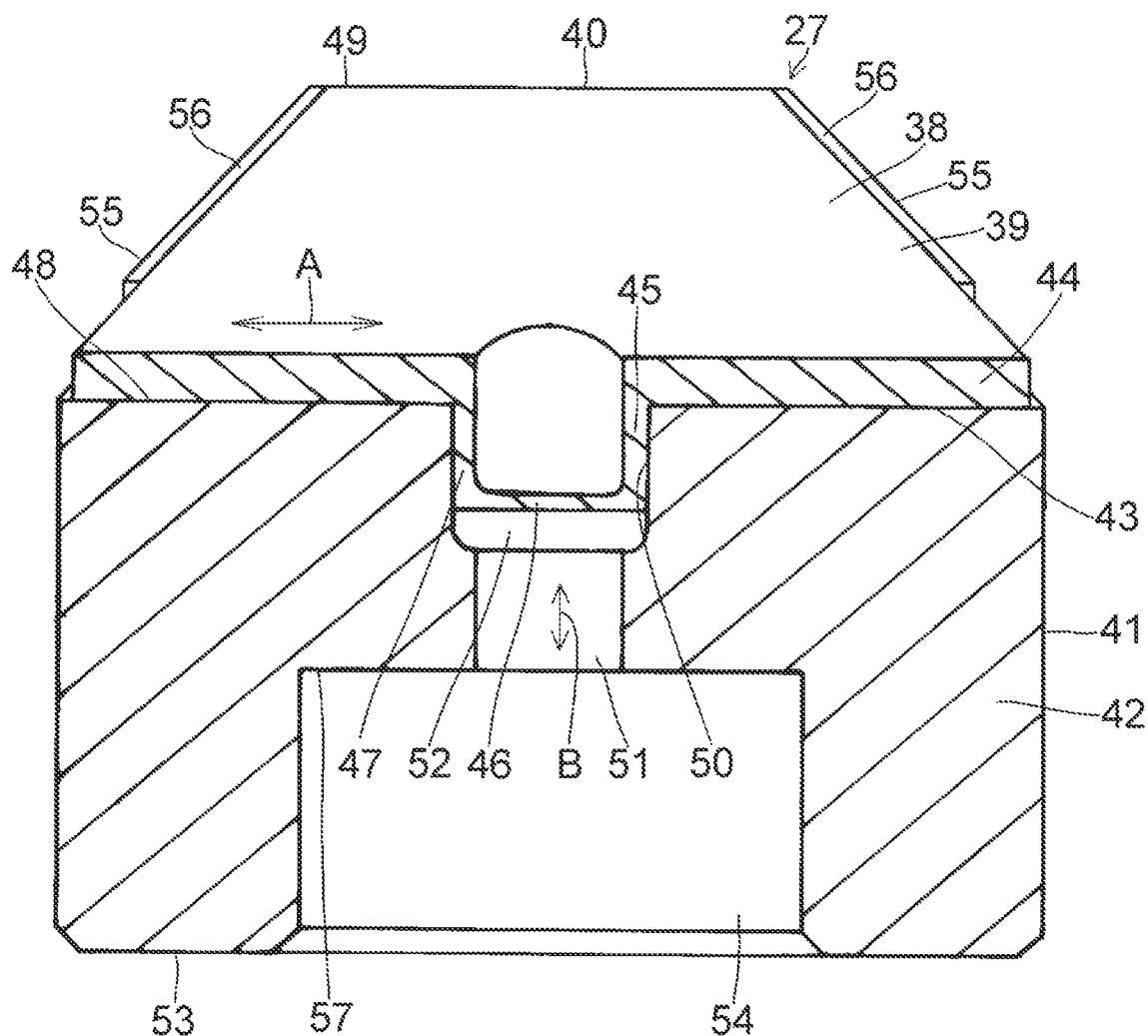
FIG. 5 is a cross-sectional schematic view taken along line V-V in the rack guide shown in FIG. 4.

The present invention and embodiments thereof will now be described in detail. The present invention is not intended to be limited by the embodiments.

A multi-layer sliding member 1 as a preferred example of the present invention, as shown in FIG. 1, includes a backing plate 2 formed from a steel plate, a copper-plated or nickel-plated layer 4 formed on one surface 3 of the backing plate 2, a porous sintered metal layer 5 integrally bonded through the layer 4 to the surface 3 of the backing plate 2, a coating layer 8 filling pores 6 of and coating on a surface 7 of the porous sintered metal layer 5 and formed from a synthetic resin composition. The synthetic resin composition contains PTFE as the main component and further contains, as additives, 5 to 30% by mass of a thermotropic liquid crystal polymer, 5 to 12% by mass of a polyarylketone resin, 5 to 12% by mass of a melt moldable fluororesin, and 1 to 5% by mass of a polyimide resin. The coating layer 8 formed from the synthetic resin composition has a structure in which the PTFE is a matrix and, in the matrix, the thermotropic liquid crystal polymer, the polyarylketone resin, the melt moldable fluororesin, and the polyimide resin are dispersed.

In the synthetic resin composition constituting the coating layer 8 in the multi-layer sliding member 1 of the present invention, as the PTFE that is the main component, a PTFE typically used for molding in the form of a fine powder is used. Specific examples of the fine powder include "Polyflon F201 (trade name)" manufactured by Daikin Industries, "Teflon 6CJ (trade name)" manufactured by Mitsui-DuPont Fluorochemicals, and "Fluon CD097E (trade name)" manufactured by AGC.

Examples of the thermotropic liquid crystal polymer to be compounded with the PTFE include a wholly aromatic polyester resin, a wholly aromatic polyamide resin, and a wholly aromatic polyester amide resin, and a wholly aromatic polyester resin is particularly preferred. In the description, the thermotropic liquid crystal polymer means a polymer that is converted into a liquid crystal (in an intermediate state between crystal and liquid, molecule directions maintain a certain regularity, but a three-dimensional position regularity is lost) by heating and melting. Examples of the wholly aromatic polyester resin include a monomer of p-hydroxybenzoic acid and a copolymer of p-hydroxybenzoic acid with at least one monomer selected from diols (including an aromatic diol such as dihydroxybiphenyl, and a $C_{2-6}$ alkanediol such as ethylene glycol), aromatic dicarboxylic acids (such as terephthalic acid), and aromatic hydroxycarboxylic acids (such as oxynaphthoic acid).

Specific examples include a wholly aromatic polyester resin formed from a poly p-hydroxybenzoic acid (polyoxybenzoyl polyester) and represented by Chemical Formula (I) [for example, "Sumikasuper E101 (trade name)" manufactured by Sumitomo Chemical], a wholly aromatic polyester resin formed from p-hydroxybenzoic acid, 4, 4'-dihydroxybiphenyl, and terephthalic acid as building blocks and represented by Chemical Formula (II) (for example, "Sumikasuper (trade name)" manufactured by Sumitomo Chemical and "Xydar (trade name)" manufactured by JXTG Energy), a wholly aromatic polyester resin formed from p-hydroxybenzoic acid and 6-hydroxy-2-naphthalene carboxylic acid as building blocks and represented by Chemical Formula (III) (for example, "Vectra (trade name)" manufactured by Polyplastics), and a wholly aromatic polyester resin formed from p-hydroxybenzoic acid and polyethylene terephthalate as building blocks and represented by Chemical Formula (IV) (for example, "Rodrun (trade name)" manufactured by Unitika).

carbonyl group and through a flexible ether bond, and has excellent heat resistance, impact resistance, wear resistance/sliding characteristics, and the like. As typical examples thereof, the structure of a polyether ketone (hereinafter abbreviated as PEK) resin is represented by Chemical Formula (V), the structure of a polyether ether ketone (hereinafter abbreviated as PEEK) resin is represented by Chemical Formula (VI), and the structure of a polyether ketone ketone (hereinafter abbreviated as PEKK) resin is represented by Chemical Formula (VII).

[Chemical Formula 1]

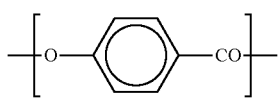
[I]

[Chemical Formula 5]

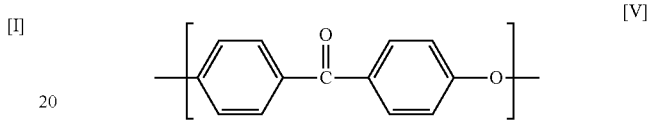
[V]

[Chemical Formula 2]

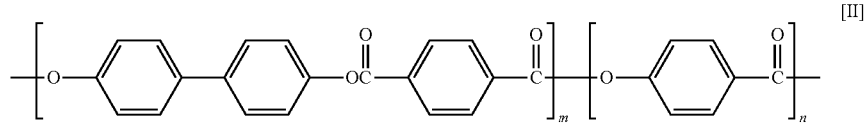
[II]

[Chemical Formula 3]

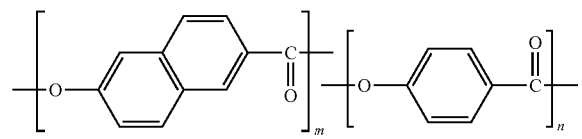
[III]

[Chemical Formula 6]

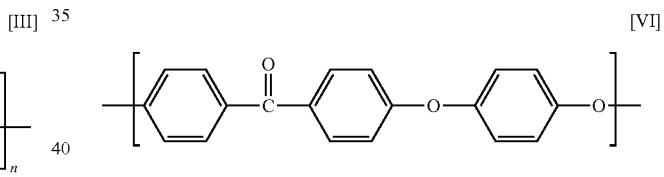
[VI]

[Chemical Formula 4]

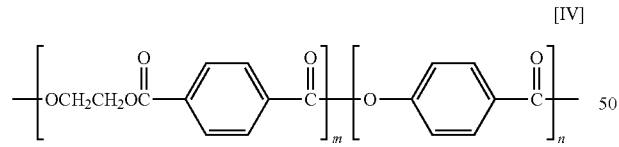
[IV]

[Chemical Formula 7]

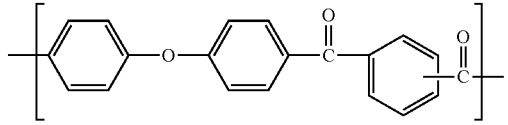
[VII]

The thermotropic liquid crystal polymer is compounded with the PTFE as the main component and particularly helps the low friction properties of the PTFE, specifically, of the coating layer. Relative to the PTFE, the compounding amount is 5 to 30% by mass and preferably 10 to 20% by mass. If the amount is less than 5% by mass, the low friction properties of the coating layer is insufficiently helped, and if the amount is more than 30% by mass, the content of the liquid crystal polymer is excess in the coating layer, and accordingly the low friction properties of the coating layer may be impaired.

The polyarylketone resin is a crystalline aromatic thermoplastic resin having a polymer structure in which a benzene ring is linked at para positions through a rigid The polyarylketone resin is compounded with the PTFE as the main component and particularly improves the wear resistance of the coating layer. Relative to the PTFE, the compounding amount of the polyarylketone resin is 5 to 12% by mass and preferably 5 to 10% by mass. If the amount of the polyarylketone resin is less than 5% by mass, the wear resistance of the coating layer cannot be improved, and even if the amount is more than 12% by mass, a further improvement in the wear resistance of the coating layer is not achieved. Examples of the polyarylketone resin include a PEK resin, a PEEK resin, and a PEKK resin. In a preferred example, the polyarylketone resin is at least one selected from a PEK resin, a PEEK resin, and a PEKK resin. Specific examples of the PEK resin include "VICTREX-HT (trade name)" manufactured by Victrex, specific examples of the PEEK resin include "PEEK-150PF (trade name)" and "PEEK-450PF (trade name)" manufactured by Victrex and "VESTAKEEP (trade name)" manufactured by Daicel-Evonik, and specific examples of the PEKK resin include "Kepstan 7002 (trade name)" and "Kepstan 8002 (trade name)" manufactured by Arkema.

The melt moldable fluororesin is compounded with the PTFE as the main component together with the polyarylketone resin and contributes to an improvement in the wear resistance of the coating layer. Examples of the melt moldable fluororesin include a tetrafluoroethylene-perfluoroalkyl vinyl ether copolymer resin (hereinafter abbreviated as PFA), a tetrafluoroethylene-hexafluoropropylene copolymer resin (FEP), and a tetrafluoroethylene-ethylene copolymer resin (ETFE), and a PFA having a melting point of 300 to 310° C. at which the PFA is compatible with PTFE is preferably used. Relative to the PTFE, the compounding amount of the melt moldable fluororesin is 5 to 12% by mass and preferably 5 to 10% by mass. In particular, when the melt moldable fluororesin is used in the same amount as the amount of the polyarylketone resin, the wear resistance of the coating layer is improved. Specific examples of the PFA include "Neoflon (registered trademark) PFA (trade name)" manufactured by Daikin Industries, "Teflon (registered trademark) PFA (trade name)" manufactured by Mitsui-DuPont Fluorochemicals, and "Fluon (registered trademark) PFA (trade name)" manufactured by AGC.

The polyimide resin stabilizes the friction coefficient of the coating layer and contributes to an improvement in the wear resistance. The polyimide resin may be either a thermosetting polyimide resin or a thermoplastic polyimide resin, and a thermosetting polyimide resin that undergoes condensation reaction or addition reaction to form a three-dimensional network structure and to be cured is preferred. Specific examples of the thermosetting polyimide resin include "UIP-R (trade name)" and "UIP-S (trade name)" manufactured by Ube Industries, "P84 (trade name)" manufactured by Daicel-Evonik, and "BANI-M (trade name)" and "BANI-X (trade name)" manufactured by Maruzen Petrochemical. Specific examples of the thermoplastic polyimide resin include "AURUM (trade name)" manufactured by Mitsui Chemicals.

Relative to the PTFE, the compounding amount of the polyimide resin is 1 to 5% by mass and preferably 2 to 4% by mass. If the amount of the polyimide resin is less than 1% by mass, the coating layer has insufficient reinforcement effect, and the wear resistance is not improved. If the amount of the polyimide resin is more than 5% by mass, the low friction properties of the PTFE is impaired, and the wear resistance may be impaired.

In the multi-layer sliding member 1 of the present invention, the synthetic resin composition constituting the coating layer 8 may contain, as additional components, at least one of carbon black selected from furnace black, channel black, acetylene black, and thermal black, graphite (natural or artificial graphite), and molybdenum disulfide, at a content of 0.2 to 5% by mass. Such a component is contained typically as a pigment for coloring the coating layer. Specific examples of the carbon black include "KETJENBLACK EC (trade name)" and "KETJENBLACK EC-600JD (trade name)" manufactured by Ketjenblack International, specific examples of the graphite include "Natural graphite (CB series)" and "Artificial graphite (PAG series)" manufactured by Nippon Graphite Industries, and specific examples of the molybdenum disulfide include "Molybdenum disulfide powder" manufactured by Daito.

Next, a method for producing the multi-layer sliding member 1 of the present invention will be described.

As the steel plate constituting the backing plate 2, a rolled steel for general structure (SS400 and the like) in accordance with JIS G3101 or a cold-reduced carbon steel sheet (SPCC and the like) in accordance with JIS G3141 is used. As the steel plate, a continuous strip provided as a hoop material prepared by winding a plate into a coil shape is preferably used, but the continuous strip is not necessarily used, and a strip cut into an appropriate length may also be used. Such a strip may be provided with a layer 4 including copper plating or nickel plating to improve the corrosion resistance.

As a metal powder constituting the porous sintered metal layer 5 integrally bonded to one surface 3 of the backing plate 2, a copper alloy powder passing through about a 100-mesh screen, including bronze, lead bronze, or phosphor bronze powder, which has excellent friction and wear characteristics, is used. Depending on a purpose, a powder of a metal other than the copper alloy, such as an aluminum alloy and iron, can also be used. As the particle form of the metal powder, a metal powder in a massive form, a spherical form, or an irregular form can be used. The alloy powder in the porous sintered metal layer 5 is firmly bonded to each other and to a strip such as the above steel plate, and the layer is required to have a certain thickness and an intended porosity. The porous sintered metal layer 5 preferably has a thickness of about 0.15 to 0.40 mm and a porosity of about 10% by volume or more.

The synthetic resin composition constituting the coating layer 8 of the multi-layer sliding member 1 is prepared as follows: predetermined amounts of the PTFE as the main component and the thermotropic liquid crystal polymer, the polyarylketone resin, the melt moldable fluororesin, and the polyimide resin as the additives are weighed; the whole is mixed with a mixer to prepare a mixture; a petroleum solvent is added to the prepared mixture; and the whole is stirred and mixed. Through the process, a synthetic resin composition having wettability is prepared. The PTFE and the additives are mixed at a temperature not higher than a room temperature transition point (19° C.) of the PTFE, and the resulting mixture and a petroleum solvent is stirred and mixed at substantially the same temperature as above. By adopting such a temperature condition, the PTFE is prevented from fibrilation, and a homogenous mixture (synthetic resin composition) can be prepared.

As the petroleum solvent, naphtha, toluene, xylene, an aliphatic hydrocarbon solvent such as a paraffin solvent and a naphthene solvent, or a mixed solvent thereof is used. The content of the petroleum solvent is 15 to 30 parts by mass relative to 100 parts by mass of a mixture of the PTFE powder and the fillers. If the petroleum solvent is used at a content of less than 15 parts by mass, the resulting synthetic resin composition with wettability has poor spreading properties in the filling and coating step described later, for the pores 6 and the surface 7 of the porous sintered metal layer 5, and consequently, the filling and coating layer 8 for the porous sintered metal layer 5 may be likely to have unevenness. Meanwhile, if the petroleum solvent is used at a content of more than 30 parts by mass, the filling and coating operation becomes difficult. In addition, the coating layer of the synthetic resin composition may have an uneven thickness, and this may reduce the adhesion strength between the coating layer 8 formed from the synthetic resin composition and the porous sintered metal layer 5. Specific examples of the petroleum solvent include "Exxsol (trade name)" manufactured by Exxon chemical as a naphthene solvent and "Isopar (trade name)" manufactured by Exxon chemical as an isoparaffin solvent.

The multi-layer sliding member 1 of the present invention is produced through production steps (a) to (d) as shown in FIG. 2.

Step (a): A backing plate 2 integrally bonded with a porous sintered metal layer 5 and supplied as a hoop material 9 wound into a coil shape is sent forward by guide rollers 10 and 10; on the surface 7 of the porous sintered metal layer 5 on the backing plate 2, the synthetic resin composition (mixture) 12 with wettability stored in a hopper 11 is supplied and spread; and next the whole is rolled by pressure rollers 13 and 13 to fill pores 6 of the porous sintered metal layer 5 with the synthetic resin composition and to form, on the surface 7 of the porous sintered metal layer 5, a coating layer 8 of the synthetic resin composition having a uniform thickness. Filling the pores 6 of the porous sintered metal layer 5 with the synthetic resin composition proceeds substantially completely in this step.

Step (b): The backing plate 2 having the coating layer 8 of the synthetic resin composition on the surface 7 of the porous sintered metal layer 5 treated in the step (a) is kept in a drying furnace 14 for several minutes to remove the petroleum solvent; and then the dried synthetic resin composition is subjected to pressure rolling treatment with rollers 15 and 15 to give a predetermined thickness.

Step (c): The backing plate 2 treated in the step (b) is introduced into a heat baking furnace 16 to be heated and sintered; and then the backing plate 2 is passed through the heat baking furnace 16 to complete the sintering of the coating layer 8. Next, variations in size of the backing plate 2 are adjusted, and the thickness of the coating layer 8 is finely adjusted by roller treatment with size adjustment rollers 17 and 17.

Step (d): The backing plate 2 size-adjusted in the step (c) is passed through a cooler 18 such as a cold-water sprayer, and the backing plate 2 is cooled to room temperature. Then, to correct undulations and the like of the backing plate 2, correction roller treatment is performed with a correction roller apparatus 19 to correct slight undulations and the like of the backing plate 2, as needed. Next, the corrected backing plate 2 is sent forward by guide rollers 20 and 20 and is wound on a coiler 21.

In the multi-layer sliding member 1 produced through the steps (a) to (d), the porous sintered metal layer 5 has a thickness of 0.10 to 0.40 mm, and the coating layer 8 formed from the synthetic resin composition has a thickness of 0.02 to 0.20 mm. The multi-layer sliding member 1 produced in this manner is cut into an appropriate size and used in the form of a sliding plate or is bent round and used in the form of a cylindrical wrapped bush.

In the multi-layer sliding member 1 produced by the above production method, the coating layer 8 has a structure in which the PTFE as the main component is a matrix, and in the matrix, the thermotropic liquid crystal polymer, the polyarylketone resin, the melt moldable fluororesin, and the polyimide resin as additives are dispersed. In the coating layer 8, the thermotropic liquid crystal polymer helps the low friction properties of the PTFE as the matrix, the difference between static friction coefficient and kinetic friction coefficient become minimum, and the polyarylketone resin, the melt moldable fluororesin, and the polyimide resin reinforce the matrix to improve the abrasion resistance.

EXAMPLES

The present invention will next be described in further detail with reference to examples, but the present invention is not limited to the examples without departing from the scope thereof. In the following examples, sliding characteristics of multi-layer sliding members were evaluated by the reciprocating sliding test below.

<Reciprocating Sliding Test>

Test method: In conditions shown in Table 1, an arcuate plate-like formed product having a radius of 10.0 mm, a length of 20.0 mm, and a thickness of 1.05 mm (multi-layer sliding member) was fixed, a cylindrical shaft formed from high carbon-chromium bearing steel as an mating member was reciprocated over the surface of the plate-like formed product while the shaft was pressed against the surface of the plate-like formed product at a predetermined load, and the static friction coefficient and the kinetic friction coefficient between the plate-like formed product and the cylindrical shaft and the wear amount were determined. The wear amount was indicated by a dimensional change (m) of the coating layer of the plate-like formed product after completion of the test (20 hours).

[Table 1]
Sliding speed: 3 m/min
Load: 200 kgf
Time: 20 hours
Stroke: 150 mm
Lubrication: A lithium grease ("Multemp AC-P (trade name)" manufactured by KYODO YUSHI) was applied onto the sliding face before test
Mating member: A reinforced carbon steel material for machine structure: (S45C: JIS G4051)

In the following examples, as the PTFE, the thermotropic liquid crystal polymer, the polyarylketone resin, the melt moldable fluororesin, the polyimide resin, and the carbon black, materials shown below were used.

<PTFE>
(1) PTFE-1: Fine powder "Polyflon F201 (trade name)" manufactured by Daikin Industries
(2) PTFE-2: "Teflon 6CJ (trade name)" manufactured by Mitsui-DuPont Fluorochemicals <Thermotropic Liquid Crystal Polymer>
(1) Wholly aromatic polyester resin-1: "Sumikasuper E101 (trade name)" manufactured by Sumitomo Chemical
(2) Wholly aromatic polyester resin-2: "Vectra (trade name)" manufactured by Polyplastics
(3) Wholly aromatic polyester resin-3: "Xydar (trade name)" manufactured by JXTG Energy
(4) Wholly aromatic polyester resin-4: "Rodrun (trade name)" manufactured by Unitika <Polyarylketone Resin>
(1) PEK: "VICTREX-HT (trade name)" manufactured by Victrex
(2) PEEK: "VESTAKEEP (trade name)" manufactured by Daicel-Evonik
(3) PEKK: "Kepstan 8002 (trade name)" manufactured by Arkema <Melt Moldable Fluororesin>
PFA: "Neoflon (registered trademark) ACX-34 (trade name)" manufactured by Daikin Industries <Polyimide Resin>
(1) Polyimide resin-1: "UIP-R (trade name)" manufactured by Ube Industries
(2) Polyimide resin-2: "BANI-M (trade name)" manufactured by Maruzen Petrochemical
(3) Polyimide resin-3: "BANI-X (trade name)" manufactured by Maruzen Petrochemical <Coloring Material for Sliding Layer>
(1) Carbon black: "KETJENBLACK EC (trade name)" manufactured by Ketjenblack International
(2) Molybdenum disulfide: "Molybdenum disulfide powder" manufactured by Daito
<Backing Plate>
A backing plate including a backing plate formed from a steel plate having a thickness of 0.70 mm and having, on a surface, a copper-plated layer and including a porous sintered metal layer formed from bronze alloy, having a thickness of 0.25 mm, and integrally bonded to one surface of the backing plate.

Examples 1 to 15

As shown in Table 2 to Table 4, a PTFE as the main component, a thermotropic liquid crystal polymer, a polyarylketone resin, a melt moldable fluororesin, and a polyimide resin as additives, and a pigment as an optional component were supplied into a Henschel Mixer and were stirred and mixed, then relative to 100 parts by mass of the resulting mixture, 20 parts by mass of an isoparaffin solvent ("Isopar (trade name)" manufactured by Exxon chemical) was added as a petroleum solvent, and the whole was mixed at a temperature (15° C.) not higher than the room temperature transition point of the PTFE, giving a synthetic resin composition with wettability.

The synthetic resin composition with wettability was supplied and spread on the porous sintered metal layer on the backing plate, and the whole was rolled by rollers so that the synthetic resin composition would have a thickness of 0.20 mm, giving a multi-layer plate having a coating layer of the synthetic resin composition that filled pores of and coated on the surface of the porous sintered metal layer. Subsequently, the multi-layer plate was kept in a hot-air drying furnace to previously remove the solvent, and the multi-layer plate having the dried coating layer was rolled by rollers, allowing the coating layer coated on the surface of the porous sintered metal layer to have a thickness of 0.10 mm.

Next, the multi-layer plate after the pressure treatment was heated and sintered in a furnace, and then was subjected to pressure treatment once again by rollers to perform adjustment such as size adjustment and undulation adjustment, yielding a multi-layer sliding member. The multi-layer sliding member after the adjustment was cut into a strip shape, and the strip was bent while the coating layer was inside, giving an arcuate multi-layer sliding member test piece having a radius of 10.0 mm, a length of 20.0 mm, and a thickness of 1.05 mm.

Comparative Example 1

As shown in Table 5, PTFE-2 (80% by mass) and 20% by mass of lead powder were supplied into a Henschel Mixer and were stirred and mixed, then relative to 100 parts by mass of the resulting mixture, 20 parts by mass of the petroleum solvent (same as in the above examples) was added, and the whole was mixed at a temperature (15° C.) not higher than the room temperature transition point of the PTFE, giving a synthetic resin composition with wettability. Subsequently, the same procedure as in the above examples was performed, giving a multi-layer sliding member. The multi-layer sliding member was cut into a strip shape, and the strip was bent while the coating layer was inside, giving an arcuate multi-layer sliding member test piece having a radius of 10.0 mm, a length of 20.0 mm, and a thickness of 1.05 mm.

Comparative Example 2

As shown in Table 5, 10% by mass of baryte barium sulfate, 20% by mass of lead powder, and PTFE-2 (70% by mass) were supplied into a Henschel Mixer and were stirred and mixed, then relative to 100 parts by mass of the resulting mixture, 20 parts by mass of the petroleum solvent (same as in the above examples) was added, and the whole was mixed at a temperature not higher than the room temperature transition point of the PTFE, giving a synthetic resin composition with wettability. Subsequently, the same procedure as in the above examples was performed, giving a multi-layer sliding member. The multi-layer sliding member was cut into a strip shape, and the strip was bent while the coating layer was inside, giving an arcuate multi-layer sliding member test piece having a radius of 10.0 mm, a length of 20.0 mm, and a thickness of 1.05 mm.

TABLE 2

| | | Example | | | | |
|---|---|---|---|---|---|---|
| | | 1 | 2 | 3 | 4 | 5 |
| Synthetic resin composition | (PTFE) | | | | | |
| | PTFE-1 | 83 | 65 | 65 | 73 | 68 |
| | PTFE-2 | | | | | |
| | (Thermotropic liquid crystal polymer) | | | | | |
| | Wholly aromatic polyester resin-1 | 5 | 10 | 10 | 15 | 20 |
| | Wholly aromatic polyester resin-2 | | | | | |
| | Wholly aromatic polyester resin-3 | | | | | |
| | Wholly aromatic polyester resin-4 | | | | | |
| | (Melt moldable fluororesin) | | | | | |
| | PFA | 5 | 10 | 10 | 5 | 5 |
| | (Polyarylketone resin) | | | | | |
| | PEK | | 10 | | | |
| | PEEK | 5 | | | 5 | 5 |
| | PEKK | | | 10 | | |
| | (Polyimide resin) | | | | | |
| | Polyimide resin-1 | 2 | 5 | 5 | | 2 |
| | Polyimide resin-2 | | | | 2 | |
| | Polyimide resin-3 | | | | | |
| | (Pigment) | | | | | |
| | Carbon black | | | | | |
| | Molybdenum disulfide | | | | | |

TABLE 2-continued

|  |  | Example | | | | |
|---|---|---|---|---|---|---|
|  |  | 1 | 2 | 3 | 4 | 5 |
| Sliding characteristics | <Friction coefficient> | | | | | |
|  | Static friction coefficient | 0.116 | 0.102 | 0.106 | 0.078 | 0.068 |
|  | Kinetic friction coefficient | 0.074 | 0.056 | 0.060 | 0.036 | 0.027 |
|  | Wear amount (μm) | 68 | 65 | 66 | 60 | 50 |

TABLE 3

|  |  | Example | | | | |
|---|---|---|---|---|---|---|
|  |  | 6 | 7 | 8 | 9 | 10 |
| Synthetic resin composition | (PTFE) | | | | | |
|  | PTFE-1 | 68 | 68 | 68 | 63 | 63 |
|  | PTFE-2 | | | | | |
|  | (Thermotropic liquid crystal polymer) | | | | | |
|  | Wholly aromatic polyester resin-1 | | | | | 25 |
|  | Wholly aromatic polyester resin-2 | 20 | | | | |
|  | Wholly aromatic polyester resin-3 | | 20 | 20 | | |
|  | Wholly aromatic polyester resin-4 | | | | 20 | |
|  | (Melt moldable fluororesin) | | | | | |
|  | PFA | 5 | 5 | 5 | 7.5 | 5 |
|  | (Polyarylketone resin) | | | | | |
|  | PEK | 5 | | | | |
|  | PEEK | | 5 | | 7.5 | 5 |
|  | PEKK | | | 5 | | |
|  | (Polyimide resin) | | | | | |
|  | Polyimide resin-1 | | | | 2 | 2 |
|  | Polyimide resin-2 | 2 | | 2 | | |
|  | Polyimide resin-3 | | 2 | | | |
|  | (Pigment) | | | | | |
|  | Carbon black | | | | | |
|  | Molybdenum disulfide | | | | | |
| Sliding characteristics | <Friction coefficient> | | | | | |
|  | Static friction coefficient | 0.074 | 0.076 | 0.078 | 0.086 | 0.094 |
|  | Kinetic friction coefficient | 0.034 | 0.035 | 0.042 | 0.040 | 0.051 |
|  | Wear amount (μm) | 56 | 56 | 58 | 52 | 58 |

TABLE 4

|  |  | Example | | | | |
|---|---|---|---|---|---|---|
|  |  | 11 | 12 | 13 | 14 | 15 |
| Synthetic resin composition | (PTFE) | | | | | |
|  | PTFE-1 | 60 | 58 | 64 | 72 | 66 |
|  | PTFE-2 | | | | | |
|  | (Thermotropic liquid crystal polymer) | | | | | |
|  | Wholly aromatic polyester resin-1 | | 30 | 10 | 15 | 20 |
|  | Wholly aromatic polyester resin-2 | 25 | | | | |
|  | Wholly aromatic polyester resin-3 | | | | | |
|  | Wholly aromatic polyester resin-4 | | | | | |
|  | (Melt moldable fluororesin) | | | | | |
|  | PFA | 5 | 5 | 10 | 5 | 5 |
|  | (Polyarylketone resin) | | | | | |
|  | PEK | | 5 | | | |
|  | PEEK | 5 | | | 5 | 5 |
|  | PEKK | | | 10 | | |
|  | (Polyimide resin) | | | | | |
|  | Polyimide resin-1 | | | 5 | | 2 |
|  | Polyimide resin-2 | | 2 | | 2 | |
|  | Polyimide resin-3 | 5 | | | | |
|  | (Pigment) | | | | | |
|  | Carbon black | | | 1 | | 2 |
|  | Molybdenum disulfide | | | | 1 | |
| Sliding characteristics | <Friction coefficient> | | | | | |
|  | Static friction coefficient | 0.096 | 0.112 | 0.106 | 0.078 | 0.068 |
|  | Kinetic friction coefficient | 0.054 | 0.066 | 0.060 | 0.036 | 0.027 |
|  | Wear amount (μm) | 62 | 56 | 66 | 60 | 50 |

TABLE 5

| | Comparative Example | |
| --- | --- | --- |
| | 1 | 2 |
| <Coating layer (synthetic resin composition)> | | |
| PTFE-2 | 80 | 70 |
| Barium sulfate (baryte) | | 10 |
| Lead | 20 | 20 |
| <Friction coefficient> | | |
| Static friction coefficient | 0.240 | 0.184 |
| Kinetic friction coefficient | 0.120 | 0.082 |
| Wear amount (μm) | 98 | 86 |

The above test results reveal that the multi-layer sliding members of Examples had a small difference between static friction coefficient and kinetic friction coefficient, a small wear amount, and stable slidability. In contrast, it was ascertained that the multi-layer sliding members of Comparative Examples had a large difference between static friction coefficient and kinetic friction coefficient, caused stick-slip (adhesion-sliding), and generated an abnormal frictional sound caused by the stick-slip.

Next, a rack-and-pinion steering apparatus including a rack guide including the above multi-layer sliding member will be described.

In FIG. 3 to FIG. 6, a rack-and-pinion steering apparatus 22 includes a pinion 23 rotatable in an R-direction, a rack bar 25 that has a rack tooth 24 engaged with the pinion 23 and is linearly movable in a sliding direction A (direction orthogonal to the plane of FIG. 3), a gearbox 26 supporting the pinion 23 rotatably in the R-direction, a rack guide 27 slidably supporting the rack bar 25, and an elastic element 28 pressing the rack guide 27 toward the pinion 23.

A pinion shaft 29 integrally provided with the pinion 23 is supported by the gearbox 26 through rolling bearings 30 and 30 rotatably in the R-direction and is configured to rotate in the R-direction by steering operation.

The rack bar 25 that is linearly moved in the sliding direction A through the engagement between the pinion 23 and the rack tooth 24 by rotation of the pinion 23 in the R-direction has an arcuate convex sliding face 31 at the opposite side to the face with the rack tooth 24.

The gearbox 26 through which the rack shaft 25 passes in the sliding direction A includes a gearbox main body 32 to which the rolling bearings 30 and 30 are attached, a cylinder portion 34 integrally formed with the gearbox main body 32 and having a cylindrical inner peripheral face 33, and a closure member 36 screwed through a screw 35 to one end of the cylinder portion 34. The closure member 36 is fixed to the cylinder portion 34 by lock nuts 37 screwed to the closure member 36.

The rack guide 27 includes an arcuate sliding piece 39 that is in slidable contact with the sliding face 31 of the rack bar 25 and has an arcuate concave sliding face 38 and includes a rack guide base body 42 supporting the sliding piece 39 on one end face 40 in an axis direction B orthogonal to the sliding direction A and having a cylindrical outer peripheral face 41 that is in slidable contact with the inner peripheral face 33.

The arcuate sliding piece 39 formed from the multi-layer sliding member 1 and prepared by benting round the member while the coating layer 8 is inside includes a sliding piece main body 44 having the arcuate concave sliding face 38 on one face and an arcuate convex fixing face 43 on the other face opposite to the sliding face 38 and includes a bottomed cylindrical hollow protrusion 47 that has a cylinder portion 45 integrally formed on the fixing face 43 of the sliding piece main body 44 and a bottom portion 46 integrally formed at one end of the cylinder portion 45 and is integrally formed on the fixing face 43.

The rack guide base body 42 provided in the cylinder portion 34 of the gearbox 26, formed from aluminum, an aluminum alloy material, a sintered metal material, or the like, and having the cylindrical outer peripheral face 41 includes one end face 40 in the axis direction B having an arcuate concave supporting face 48 that supports the sliding piece main body 44 and having a pair of flat faces 49 that has a crescent shape in a planar view and continues to the supporting face 48, a fitting hole portion 52 having a fitting hole 50 that has an opening at the center of the supporting face 48 and fits, with interference, the cylinder portion 45 of the bottomed cylindrical hollow protrusion 47 of the sliding piece 39 and having a small-diameter hole 51 that communicates at one end with the fitting hole 50 and has a smaller diameter than that of the fitting hole 50, a hollow cylinder portion 54 communicating with the small-diameter hole 51 and having an opening on the other end face 53 of the rack guide base body 42 in the axis direction B, and four ridge portions 55 integrally provided on both edges of the supporting face 48 in the sliding direction A along the supporting face 48 and having a uniform height.

The cylinder portion 45 of the bottomed cylindrical hollow protrusion 47 is press-fit into the fitting hole 50, the fixing face 43 is in contact with the supporting face 48, and the outer peripheral edge of the sliding piece main body 44 is engaged with the ridge portions 55. Accordingly, the sliding piece 39 is held and fixed to the supporting face 48. In the rack guide 27 that includes the rack guide base body 42 including the fitting hole portion 52 having the opening on the supporting face 48 on one side, communicating with the hollow cylinder portion 54 on the other side, and to which the bottomed cylindrical hollow protrusion 47 of the sliding piece 39 is fit and includes the arcuate sliding piece 39 fit to and held by the rack guide base body 42, the sliding face 38 of the sliding piece main body 44 is located at the side of the sliding face 31 of the rack shaft 25 from the top face 56 of the four ridge portions 55.

In the sliding piece 39 fit to and held by the supporting face 48 of the rack guide base body 42, the bottom portion 46 functions as a reinforcing part to hold the shape of the cylinder portion 45, and thus the hollow protrusion 47 is firmly held in the fitting hole 50 of the rack guide base body 42 over a long time. The sliding piece main body 44 is engaged with the four ridge portions 55 of the rack guide base body 42 and thus is held by the rack guide base body 42 without positional aberration on the supporting face 48 of the rack guide base body 42.

The elastic element 28 includes a coil spring 58 that is in contact with an annular face 57 of the rack guide base body 42 defining the hollow cylinder portion 54 at one end, is in contact with and compressed by the closure member 36 at the other end, and is provided between the rack guide base body 42 and the closure member 36. The coil spring 58 elastically presses the sliding face 38 of the sliding piece 39 against the sliding face 31 of the rack shaft 25 through the rack guide base body 42.

Figure 8:
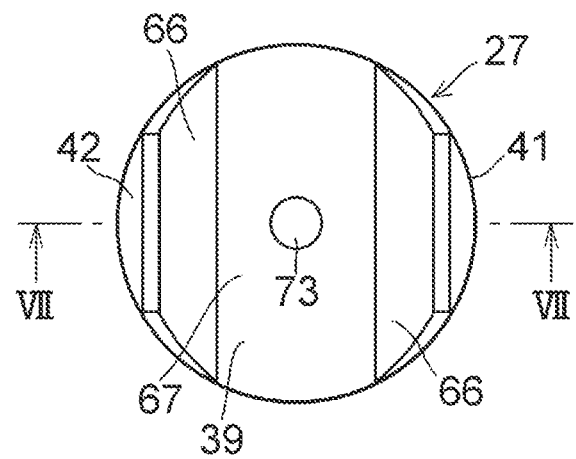
FIG. 8 is a schematic plan view of the rack guide shown in FIG. 7.

A rack guide 27 in FIG. 7 and FIG. 8 showing another example of the rack guide 27 included in the rack-and-pinion steering apparatus 22 includes a rack guide base body 42 formed from aluminum, an aluminum alloy material, a sintered metal material, or the like and having a cylindrical outer peripheral face 41 and includes a sliding piece 39 fit to and held by the rack guide base body 42.

The rack guide base body 42 includes, at one end in the axis direction B, a concave face 62 having a pair of flat faces 59 and 59 facing together, a pair of inclined faces 60 and 60 oppositely, integrally extending from the corresponding flat faces 59 and 59, and a bottom flat face 61 integrally extending from the pair of flat faces 59 and 59, includes, at the other end in the axis direction B, a cylindrical concave 64 having an opening on the other end face 63, and includes, at the center of the bottom flat face 61 of the concave face 62, a cylindrical fitting hole 65 having an opening communicating with the cylindrical concave 64.

The sliding piece 39 formed from the multi-layer sliding member includes a sliding piece main body 71 that has a concave face 69 having a pair of inclined face portions 66 and 66 opposite together, a pair of flat face portions 67 and 67 continuing from the corresponding inclined face portions 66 and 66, and a bottom face portion 68 continuing from the flat face portions 67 and 67 and has, on the opposite side to the concave face 69, a fixing face 70 having a complementary shape to the concave face 69 and includes a bottomed cylindrical hollow protrusion 74 that has a cylinder portion 72 integrally formed at the center of the bottom face portion 68 of the sliding piece main body 71 and extending toward the backing plate side, has a bottom portion 73 integrally formed at one end of the cylinder portion 72, and is integrally formed on the fixing face 70.

The rack guide 27 is formed while the bottomed cylindrical hollow protrusion 74 of the sliding piece 39 is fit to the fitting hole 65 at the center of the bottom flat face 61 on the concave face 62 of the rack guide base body 42, and the sliding piece 39 is seated on the concave face 62 of the rack guide base body 42. The sliding piece 39 of the rack guide 27 is in slidable contact with the outer peripheral face of the rack bar 25, in the example, with the outer peripheral face (not shown) having a complementary shape to the concave face 69, and supports the rack bar 25 slidably.

The rack guide 27 including the sliding piece 39 formed from the multi-layer sliding member 1 of the present invention generates a small sliding frictional resistance to the rack bar 25 and has a small difference between static friction coefficient and kinetic friction coefficient. Hence, a rack-and-pinion steering apparatus generating no abnormal frictional sound caused by stick-slip or the like and capable of achieving smooth steering feel can be produced.

As described above, the multi-layer sliding member of the present invention has a small difference between static friction coefficient and kinetic friction coefficient and has excellent friction and wear characteristics. When the multi-layer sliding member having a small difference between static friction coefficient and kinetic friction coefficient and having excellent friction and wear characteristics is used as a sliding piece of a rack guide, a rack-and-pinion steering apparatus similarly having a small difference between friction coefficient and kinetic friction coefficient, exhibiting excellent friction and wear characteristics, and capable of achieving smooth steering feel can be produced.

DESCRIPTION OF REFERENCE NUMERALS

1 multi-layer sliding member
2 backing plate
5 porous sintered metal layer
8 coating layer
22 rack-and-pinion steering apparatus
23 pinion
24 rack tooth
25 rack shaft
26 gearbox
27 rack guide
28 elastic element
29 pinion shaft
39 sliding piece
42 rack guide base body

The invention claimed is:

1. A multi-layer sliding member comprising:
   a backing plate;
   a porous sintered metal layer integrally bonded to one surface of the backing plate; and
   a coating layer filling pores of the porous sintered metal layer, coating on a surface of the porous sintered metal layer, and formed from a synthetic resin composition, wherein
   the synthetic resin composition contains a tetrafluoroethylene resin as a main component and contains, as additives, 5 to 30% by mass of a thermotropic liquid crystal polymer, 5 to 12% by mass of a polyarylketone resin, 5 to 12% by mass of a melt moldable fluororesin, and 1 to 5% by mass of a polyimide resin.

2. The multi-layer sliding member according to claim 1, wherein the synthetic resin composition contains, as an additional component, at least one of carbon black, graphite, and molybdenum disulfide at a content of 0.2 to 5% by mass.

3. The multi-layer sliding member according to claim 1, wherein the thermotropic liquid crystal polymer is a wholly aromatic polyester resin.

4. The multi-layer sliding member according to claim 1, wherein the polyarylketone resin is at least one selected from a polyether ketone resin, a polyether ether ketone resin, and a polyether ketone ketone resin.

5. The multi-layer sliding member according to claim 1, wherein the melt moldable fluororesin is a tetrafluoroethylene-perfluoroalkyl vinyl ether copolymer resin.

6. A rack guide for a rack-and-pinion steering apparatus, the rack-and-pinion steering apparatus including:
   a gearbox;
   a pinion rotatably supported by the gearbox;
   a rack shaft having a rack tooth that is engaged with the pinion;
   a rack guide slidably supporting the rack shaft; and
   an elastic element pressing the rack guide toward the rack shaft, wherein
   the rack guide includes a rack guide base body provided in the gearbox and includes a sliding piece formed from the multi-layer sliding member according to claim 1 and fixed to the rack guide base body at a backing plate side, and
   the sliding piece has, on the coating layer, a concave sliding face that is in slidable contact with an outer peripheral face of the rack bar and slidably supports the rack bar.

7. The rack guide for a rack-and-pinion steering apparatus according to claim 6, wherein the rack guide base body includes an arcuate concave supporting face and has a fitting hole at a bottom center of the supporting face.

8. The rack guide for a rack-and-pinion steering apparatus according to claim 6, wherein the sliding piece includes an arcuate concave sliding face on the coating layer, an arcuate convex fixing face on an opposite face to the sliding face, and a bottomed cylindrical hollow protrusion integrally formed on the fixing face.

9. The rack guide for a rack-and-pinion steering apparatus according to claim 6, wherein the rack guide base body includes a concave face having a pair of flat faces facing each other, a pair of inclined faces oppositely extending from the corresponding pair of flat faces, and a bottom flat face integrally extending from the pair of flat faces, and includes a fitting hole at a center of the bottom flat face of the concave face.

10. The rack guide for a rack-and-pinion steering apparatus according to claim 6, wherein the sliding piece includes a pair of inclined face portions opposite to each other, a pair of flat face portions continuing from the corresponding inclined face portions, a bottom face portion continuing from the flat face portions, and a bottomed cylindrical hollow protrusion extending from a center of the bottom face portion toward a side of the backing plate.

* * * * *